United States Patent Office 2,888,274
Patented May 26, 1959

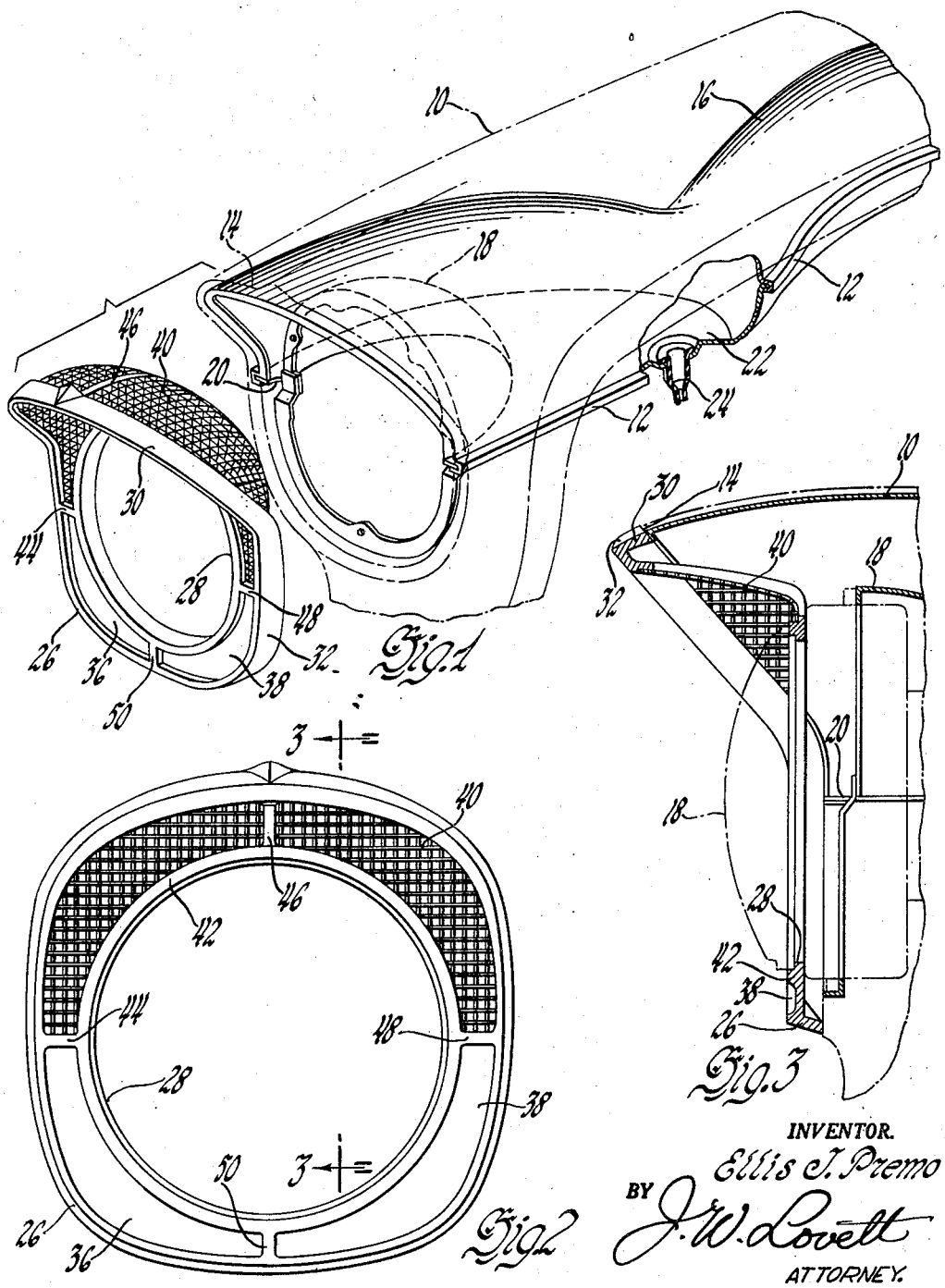

2,888,274
AUTOMOTIVE FENDER AIR DUCT STRUCTURES

Ellis J. Premo, Franklin Village, Mich., assignor to General Motors Corporation, Detroit, Mich., a corporation of Delaware Application September 24, 1956, Serial No. 611,474

1 Claim. (Cl. 280—152)

This invention relates to automotive fender air duct structures and more particularly to fender structures including headlights and also ducts for conveying outside air to heating, ventilating and/or air conditioning systems utilized in automotive vehicles.

Heretofore, ducts have been employed for conveying outside air to the passenger compartments of automobiles and the inlets for these ducts have often been located in the areas around the radiators or higher up on the vehicle cowls. The cowl areas are preferred in one respect particularly—such areas are at sufficient elevation to avoid fumes or exhaust gases from other vehicles. With the lowering of automobile body design, however, sufficient space does not exist in the cowl and along the base of the windshield to permit an adequate air inlet and duct system for properly supplying the heater, ventilator ducts or evaporator with outside air. Inlets near the front of the vehicle generally have heretofore been subject to one main difficulty—they invite the admission of exhaust fumes because of their positions in substantially the same low horizontal plane in which the exhaust pipes of other cars are found.

It has now been discovered that an air duct may be provided in a sufficiently elevated position to avoid much of the exhaust fumes despite low car design and which has added advantages such as the employ of a high pressure area of outside air supply and excellent characteristics for the effective removal of entrained moisture as well as for ornamental effect.

To these ends, an object of the present invention is to provide an improved duct structure for admitting outside air to a heating, ventilating and/or air conditioning system of an automobile. Another object is to provide a duct structure with a high outside air inlet at the front of a vehicle and an air passage conducive to the separation of entrained moisture. Another object is to provide a duct structure having a high air inlet and possessing characteristics favoring separation of entrained moisture combined with at least partial concealment of the air inlet in the interest of appearance.

A feature of the invention is a fender duct structure supporting a headlight and including a duct substantially conforming with the contour of the upper half of the headlight. Another feature is a structure embodying a headlight and an air duct within a fender with the duct having an air inlet associated with the headlight and at least partially concealed by the fender. Still another feature is a structure including a fender, a headlight in the forward end of the fender and a duct extending downwardly and rearwardly from between the periphery of the headlight and the crown of the fender and then upwardly to present a V-form passage facilitating the removal of moisture entrained in air admitted to the duct.

These and other important features of the invention will now be described in detail in the specification and then pointed out more particularly in the appended claim.

In the drawings:

Fig. 1 is an exploded and perspective view of a portion of the right front fender of an automobile showing one embodiment of the present invention;

Fig. 2 is an elevational view of a headlight grille assembly utilized in the structure of Fig. 1; and Fig. 3 is a view in section looking in the direction of the arrows 3—3 in Fig. 2, and also showing a part of an air inlet duct associated therewith.

It will be understood that the present invention may be utilized on either or both fenders of an automotive vehicle so that air may be admitted to the passenger compartment of the vehicle from either fender. The present invention does not pertain to the apparatus for treating or directing the air into the passenger compartment after the air has been admitted from the outside and freed of its entrained moisture. Obviously, the moisture free air may subsequently be heated or cooled or merely permitted to flow into the passenger compartment for ventilation purposes. Attention is directed to the United States Patent 2,696,774 granted December 14, 1954, in the name of G. R. Bayley and entitled "Automobile Heating and Ventilating System." Attention is directed to this patent merely to give one example of a system in which air inlets of the present invention could be incorporated with advantage. It is obvious that the present invention may be utilized in full or in part in either or both of the front fenders of a vehicle as stated and its use may be in combination with any of a variety of air distributing systems.

Fig. 1 of the drawings shows a right front fender 10 of a vehicle, the crowned portion of which may be joined to the metal work of the body by an elongated crimped metal strip 12 of a U-shaped cross section. The crown portion of the fender extends forwardly to form an overhanging lip 14. Concealed within the fender 10 is an outside air inlet duct 16 which extends rearwardly from a headlight assembly 18 mounted in the forward end of the fender 10. Although this duct 16 may bear a substantially horizontal wall 20 intersecting the headlight assembly 18, the duct may be said to define a substantially V-form passage extending from over the top portion of the headlight and rearwardly toward the passenger compartment. This affords a low area 22 within the duct for the placement of a drain connection 24.

Inserted within the front end of the fender 10 and encircling the headlight assembly 18 is a headlight rim 26 bearing a circular opening 28 of such size as to accommodate the headlight assembly. The upper portion 30 of the rim 26 is so formed as to fit the leading edge of the lip 14 on the fender and yet present a continuous marginal portion 32 which may be chromium plated or otherwise attractively finished if arranged as disclosed—i.e.—projecting forwardly from the fender. Obviously, this frame could be completely concealed by the fender without avoiding the principles of the present invention. For purposes of ornamentation, the lower portion of the rim 26 is provided with arcuate recesses 36 and 38 which may be painted or otherwise suitably finished to provide an attractive appearance. Surrounding the upper half of the headlight assembly 18 is a grilled portion 40 which extends from the finished margin 32 to a circular portion 42 constituting an inner rim of the headlight rim 26. The grille 40 may take various forms and, although its main purpose is for the prevention of foreign objects entering the duct 16, it also contributes to fender rigidity and should be of ornamental nature. In the present instance it has been found advantageous to provide four ribs 44, 46, 48 and 50 bridging the area between the inner rim 28 and the margin portion 32; but, of course, this rib is purely ornamental in its nature and many modifications may be utilized for this purpose. The headlight rim 26 may be held in place in the fender end surrounding the headlight assembly 18 by using screws or fastenings not shown in the drawings. It will be seen that the area immediately above an automotive headlight, particularly when the fender is provided with a lip 14, presents a high air pressure area so that impact effect upon motion of the vehicle is such as to drive a large quantity of outside air through the duct 16. It is also to be noted that the placement of the outside air inlet between the crown of the fender 10 and the headlight arrangement 18 permits partial concealment of the air inlet and promotes the ornamental effects of the overall automobile design. It should also be noted that with the outside air inlet located around the upper half of the headlight assembly 18, the air is admitted at a higher level than heretofore possible with other arrangements placed at the front of the vehicle. Cleaner air is thereby admitted and with this high air admission area a dip in the duct passage is permitted so that entrained moisture will strike the inner and upper wall surface of the duct 16 and tend to run down the sides thereof for removal by way of the drain 24. The relatively drier air then continues upwardly or horizontally as the case may be by way of the duct 16 to whatever type of air system may be utilized to serve the passenger compartment.

I claim:

An automotive structure comprising a front fender with a protruding lip, a headlight assembly mounted in the front end of said fender and cooperating with said lip completely to define an arcuate air inlet extending around the upper half only of said assembly, said lip partially concealing said air inlet, and a duct extending rearwardly and downwardly from said inlet and then upwardly to facilitate removal of moisture admitted through said inlet by entrainment.

References Cited in the file of this patent

UNITED STATES PATENTS

| | | |
|---|---|---|
| 2,086,172 | Northup | July 6, 1937 |
| 2,549,124 | Oswald | Apr. 17, 1951 |